United States Patent Office 3,304,221
Patented Feb. 14, 1967

3,304,221
POLYTETRAFLUOROETHYLENE LAMINATES
AND METHOD OF MAKING THE SAME
Earl Richard Eggleton, Warwick, R.I., assignor to Dixon
Corporation, Bristol, R.I., a corporation of Rhode
Island
No Drawing. Filed Apr. 18, 1963, Ser. No. 273,848
36 Claims. (Cl. 161—189)

This application is a continuation-in-part of application Serial Number 216,752, filed August 17, 1962, now abandoned, which in turn is a continuation-in-part of application Serial Number 141,294, filed September 28, 1961, now abandoned.

This invention relates to a process for laminating continuous sheets or films of polytetrafluoroethylene to substrates through the use of a discontinuous layer of particulate polytetrafluoroethylene.

Polytetrafluoroethylene is a particularly desirable coating material, because of its inertness to chemical attack, resistance to heat, low coefficient of friction, non-adherence and excellent electrical properties. However, it has not been possible to directly apply continuous surface coating of polytetrafluoroethylene to other surfaces because of the non-adhesiveness of the polytetrafluoroethylene to metals and most other materials.

Several methods of forming continuous coatings of polytetrafluoroethylene have been proposed but these have not been completely successful either because of the great expense involved in the process or because the final product obtained thereby does not, in actuality, contain a continuous polytetrafluoroethylene coating.

It has been suggested that polytetrafluoroethylene could be bonded to metal by the use of an intermediate bonding layer, but the difficulty with this proposal is that polytetrafluoroethylene is not only not adherent to metals but also non-adherent to most other synthetic resinous materials.

Attempts to bond polytetrafluoroethylene to various substrates through the use of auxiliary bonding agents, as for example, in the case of U.S. Patent No. 2,777,783 which teaches the use of a bonding layer comprised of a blend of polytetrafluoroethylene and another synthetic resin, are self-defeating, because the high softening point of polytetrafluoroethylene, one of the most desirable features of the polymer, cannot be fully taken advantage of, since the anchoring coating will melt at a lower temperature than the surface, thus destroying the bond between the surface coating and the base, and since the other synthetic resinous material generally detracts from the desirable properties of the polytetrafluoroethylene.

Cahne, U.S. Patent No. 2,944,917, has suggested that a suitable polytetrafluoroethylene coating can be applied to a metal base if the base is first prepared for reception of the coating by etching with an acid such as hydrochloric acid under carefully controlled conditions, such as to produce an anchoring cavity less than 30 microns in diameter and having a throttled entrance. The base is then coated with successive applications of a dispersion of polytetrafluoroethylene, with each successive application being dried and fused before the next application.

Unfortunately, the Cahne process in requiring a large number of coating, drying and fusing operations is quite costly from a commercial standpoint and furthermore the Cahne process suffers from the disadvantage that the dispersion applied coatings of polytetrafluoroethylene do not flow when fused, so that the particles do not run together and accordingly, it is extremely difficult, at best, to achieve a truly continuous coating through the surface. More likely than not, the surface coating retains the minute holes and crevices between the laid down particles which make the base accessible to attack from the surface, and in the course of wear eventually these defects result in lifting of the polytetrafluoroethylene layer from the metal surface. Furthermore, even a plurality of successive applications of polytetrafluoroethylene dispersions is generally not sufficient to produce more than about 0.001" in thickness.

Edwards et al. in Patent No. 2,984,599 suggest that polytetrafluoroethylene coated objects can be prepared by applying an aqueous dispersion of polytetrafluoroethylene to a metal base, drying the base in an oven at about 90° C. for at least 10 minutes to remove the water and form what the patentee refers to as a continuous coating on the base, heating the coated base again, this time at a temperature of at least 327° C. and preferably 380° C. for another 10 to 15 minutes, cooling, applying a preannealed sheet of polytetrafluoroethylene to the coated base, applying pressure and then heating the entire assembly in an oven to 380° C. for at least 15 minutes and preferably 40 minutes, and then leaving the assembly in the oven to cool slowly, for about two hours. The Edwards et al. process, because of the overall time consuming steps involved in its practice, would not be practical for use in the manufacture of relatively low priced items where minimization of costs is essential. Furthermore, because of the fact that polytetrafluoroethylene does not flow appreciably when heated, the bond between the polytetrafluoroethylene sheet and the coated base will not be too strong and the aqueous dispersion, when applied to metal bases fabricated from such metals as copper or iron, will, because of the presence of corrosive materials such as chromic acid, which are necessarily present in most polytetrafluoroethylene dispersions, hasten the development of oxide layers intermediate the polytetrafluoroethylene coating and the base, thereby reducing bond strength and, in some cases, actually preventing bonding.

In accordance with the instant invention, a continuous impervious layer of polytetrafluoroethylene upon a substrate, free from defects permitting access to the substrate from the other side of the layer, is obtained by laminating a continuous sheet or film of polytetrafluoroethylene to a substrate preliminarily coated with particulate polytetrafluoroethylene. The particulate polytetrafluoroethylene forms a discontinuous layer which serves as an anchoring layer, anchoring the continuous film to the substrate, thereby forming a continuous layer or film thereon. Because the particulate polytetrafluoroethylene is applied in the dry condition, for example, as a powder brushed on to the surface, there is no need to preliminarily dry the anchoring layer before application of the continuous sheet or film. In addition, due to the contact of the continuous film directly with the base, as between particles of the discontinuous particulate layer, a very strong bond is achieved both between the two polytetrafluoroethylene layers and between the continuous polytetrafluoroethylene layer and the base.

The process of this invention is applicable to the lamination of polytetrafluoroethylene to any other self-supporting material. Of particular interest are metallic substances such as metals and metal alloys, for example, iron, steel, aluminum, copper, brass, bronze, nickel, nickel-chromium, chromium, zinc, cadmium, titanium, magnesium, tin and German silver. The process of the invention is also applicable to the lamination of polytetrafluoroethylene to non-metallic substances including naturally occurring materials such as wood, woven and knitted cotton and wool fabrics, woven, sheeted or shaped articles fabricated from natural and synthetic plastic and elastomeric materials, such as rubber, glass fibers, acrylic fibers, phenolic resins, nylon resins, as well as other materials commonly employed such as brick, glass, asbestos, ceramics and porcelain. Aluminum is of particular interest commercially because of its ease of fabrication and lightness, thus making it particularly adapted for use in the manufacture of polytetrafluoroethylene-coated cooking utensils, such as pots, frying pans and the like. Copper is of interest for production of printed circuits, and steel, for baking containers and molds used in shaping plastic and synthetic resin products. The invention is also applicable to the coating of the base portion of electric irons, thereby producing a permanent tetrafluoroethylene coating thereon which withstands ironing temperatures yet affords all of the advantages of the polytetrafluoroethylene shoe described in the Jacobson Patents Nos. 2,877,577 and 2,750,697.

Preparatory for reception of the base coating of particulate polytetrafluoroethylene, it is desirable to clean the substrate surface. This can be done by application of a suitable cleaning solution or solvent, for metals, such as a halogenated hydrocarbon, for example, trichloroethylene or perchloroethylene. If the metal is resistant to oxidation, it can be heated in air at a temperature sufficiently high to burn off any dirt and other carbonaceous material adherent thereto. Aluminum, for example, can be cleaned by heating at 700° F. for approximately two hours. Suitable cleaning conditions are easily established for any metal, and such methods form no part of the instant invention, being well known to those skilled in the metal arts. Wood, cloth, or glass need no cleaning other than with warm water.

The clean surface is then roughened, if desired, for reception of the discontinuous layer. Porous surfaces, such as, for example, surfaces made of stainless steel, wood, glass or of woven fabrics generally need not be roughened. Generally, most metal surfaces require roughening. Any method of roughening can be used, mechanical, or chemical, such as oxidation, etching, or anodizing. Mechanically, this can be done by sand blasting or surface scratching. A chemical method is an etch with an acid or base, the choice of which will depend upon the substrate employed and its susceptibility to attack. Concentrated or dilute solutions of acids and bases can be used, and typical acids include, for example, hydrochloric acid, nitric acid, phosphoric acid, sulfuric acid, aqua regia, fuming sulfuric acid, chromic acid and sulfochromic acid. Typical bases include sodium hydroxide and potassium hydroxide. Easily oxidized metals such as copper and aluminum can be oxidized, such as by a hydrochloric acid-ferric chloride solution, in the case of copper, or anodized, in the case of aluminum.

The roughening, if any, can be quite superficial, since it is usually sufficient merely to roughen the base surface. The roughening conditions are in no way critical, and will depend upon the substrate and the treatment used. In a chemical treatment, the concentration of the treating agent, as well as the treatment temperature and time, are variable to be considered. In general, the more concentrated the chemical agent, and the higher the temperature, the shorter the time required to produce a satisfactorily roughened surface. In the etching of aluminum and aluminum alloys, hydrochloric acid having a concentration of from 10 to 50% and sodium hydroxide having a concentration of from 10 to 20% are quite satisfactory. For bronze and steels, nitric acid or sulfuric acid are desirable, and these can be concentrated, if desired, or can be diluted to as low as 10%. Porcelain enamel-coated metal surfaces can be readily treated using hydrofluoric acid, and chromic acid can be used for light alloys and ferrous metals. In the case of porous materials, where surface roughening is generally unnecessary, washing with warm water containing a suitable detergent is generally sufficient.

Before application of the discontinuous polytetrafluoroethylene coating, the cleaned and/or roughened surface is preferably freed from any foreign agents. This can be done by washing the surface or brushing off any foreign particles, where necessary.

The particulate polytetrafluoroethylene employed to form the discontinuous intermediate or anchoring layer between the substrate and the continuous polytetrafluoroethylene sheet or film can vary in particle size over a fairly wide range. In general, the average particle size of the particulate polytetrafluoroethylene will be within the range from about 150 to about 1000 microns in diameter. In this range of average diameters, the maximum diameter of any particles should preferably not exceed about 1200 microns. The minimum diameter permissible is determined by convenience of application. Particles that are too small to be conveniently applied, generally below about 75 microns, should be avoided. The preferred particulate polytetrafluoroethylene has an average particle diameter within the range of from about 200 to about 650 microns with no particles larger than about 800 microns or smaller than about 150 microns. A convenient method of determining the particle size and other physical properties of particulate polytetrafluoroethylene has been standardized in ASTM Standard D–1457–62T. The four types of resin molding powders listed therein, namely "Type I," "Type II," "Type III," and "Type IV" are quite satisfactory for use in this invention.

Particularly preferred for use in this invention is the "Type III" molding powder which has an apparent density of $475 \pm 100$ grams per liter and an average particle diameter of $500 \pm 150$ microns. The particulate polytetrafluoroethylene is preferably in the pure state but should not in any event contain more than about 5% of impurities.

The particulate polytetrafluoroethylene is applied in the dry condition to the surface of the substrate in any convenient manner such as by brushing, spreading, trowelling, spraying with a gaseous propellant or otherwise. The maximum thickness of the applied particulate material can be within the range from about 0.0001 inch to about 0.01 inch. Preferably the maximum thickness at any point in the applied layer will be in the range from about 0.001 inch to about 0.006 inch. The particulate polytetrafluoroethylene need not cover the entire surface of the substrate and hence the substrate will contain no particulate polytetrafluoroethylene at some points and at other points will contain amounts varying from the diameter of one particle to the maximum permissible thickness. A reasonably uniform thickness of the layer is preferred. The particulate polytetrafluoroethylene should not be concentrated at any one point but should be spread throughout the surface, including the portions along the edge, although it need not cover all portions of the surface. At least about 30%, preferably at least about 50% of the surface of the substrate which is to be laminated to polytetrafluoroethylene should be coated with particulate polytetrafluoroethylene. Furthermore, it is preferable that at least about 40% of the surface contain polytetrafluoroethylene in a thickness of at least about 0.0001 inch.

In the course of, or following application of the particulate polytetrafluoroethylene to the substrate, a small amount of pressure can be applied to temporarily anchor the particles to the substrate. Application of the particles with a trowel, thereby causing a smearing action, yields sufficient pressure for this purpose. Alternatively, passing a roller over the applied particles is also satisfactory. Only very light pressure need be applied, about 5 p.s.i. being satisfactory but greater pressures can be applied without adverse effect, subject of course, to the ability of the substrate to withstand the particular pressure.

It is quite unnecessary to apply more than one anchoring layer of particulate polytetrafluoroethylene. This layer is discontinuous since even if particles appeared to cover the entire surface of the substrate, there would still be small spaces between adjacent particles which could not be filled. While a plurality of layers could be formed by repeated applications of particulate polytetrafluoroethylene to the substrate surface, a continuous layer is not obtained, nor is the anchorage obtained any greater, because the initial layer coats the surface sufficiently, and the successive layers are merely applied to the substrate in much the same manner. Thus it will be apparent that although it can be used, no advantage is obtained by application of more than one particulate anchoring layer to the substrate.

After application of the particulate polytetrafluoroethylene coating, the coated substrate need not be heated to the softening temperature of polytetrafluoroethylene. Instead although this can be done if desired, it has been found that heating prior to application to the continuous film or sheet of polytetrafluoroethylene is unnecessary for good results. Any necessary softening of the particulate polytetrafluoroethylene, it has been found, can take place in situ at the time the composite article is heated, as will be hereinafter described.

There is then superimposed over the discontinuous anchoring layer of particulate polytetrafluoroethylene another layer having, on its surface, a continuous film or layer of polytetrafluoroethylene, such as a continuous sheet or film of polytetrafluoroethylene, a cloth impregnated and/or coated with a polytetrafluoroethylene surface layer or any other type of polytetrafluoroethylene-surfaced article.

For many applications, it is desirable that the polytetrafluoroethylene layer that is laminated to the discontinuous layer have incorporated therein a quantity of an inert granular or fibrous filler such as, for example, glass fibers, graphite, carbon black, metals, such as bronze, silver and lead, metal oxides such as iron oxide and lead oxide, molybdenum disulfide, silicates such as talc and mica, silica and other commonly used inorganic fillers and reinforcing agents. Fillers for use in and the method of preparing filled polytetrafluoroethylene compositions are well known to the art. For example, a filled polytetrafluoroethylene sheet can be prepared by mixing polytetrafluoroethylene molding powder with a granular or fibrous filler and then molding the mixture into sheet form in accordance with conventional procedures. Generally, filled polytetrafluoroethylene materials can contain up to about 65 percent by volume of filler, depending upon the properties desired in the final product. For most applications, the filled polytetrafluoroethylene will contain from about 5 to 25 percent by volume of filler, the remainder being largely pure polytetrafluoroethylene.

Any continuous film desirably is self-supporting, but if it is not self-supporting it can be supported temporarily upon a backing sheet, from which it is transferred to the particulate polytetrafluoroethylene-coated substrate. In any case, the film or layer of polytetrafluoroethylene is brought in contact with the particulate layer, and then subjected to a pressure at least sufficient to provide intimate contact between the two surfaces. Usually pressures within the range from about 1 to about 500 pounds per square inch are applied. While under pressure, the laminate should be heated at a temperature above the softening temperature of polytetrafluoroethylene, i.e., at a temperature within the range from about 650 to 800° F. After heating, the product can be allowed to cool slowly or can be cooled rapidly as by quenching in cold water or by allowing it to stand at room temperature. It is necessary while the laminate is being cooled, to maintain a pressure sufficient to keep the polytetrafluoroethylene film and the particulate layer in contact, so that the film will not pull away from the particulate layer and the substrate during cooling. The pressure initially applied can thus be continued until the laminate has cooled to room temperature. The resulting laminate of the polytetrafluoroethylene film firmly bonded to the base shows no tendency to crack or develop defects in the course of time.

When laminating polytetrafluoroethylene to substrates that cannot withstand temperatures employed, such as non-refractory materials like wood, cloth, or plastics, one or both surfaces of the substrate can be preliminarily treated to render them more heat resistant. In the case of substrates such as plastics and wood, it is sufficient if precautions are taken to prevent the substrate side of the laminate from being exposed to heat. This can be done by applying heat only to the polytetrafluoroethylene side of the laminate, as by using two platens, one heated and the other cooled. Alternatively, a suitable heat insulator, e.g., asbestos, can be used to cover those portions of the substrate not in contact with polytetrafluoroethylene.

A convenient method of rendering all of such non-refractory materials sufficiently resistant to heat involves impregnating the substrate with a thin film of an alkali metal silicate, preferably sodium silicate. An aqueous solution of the silicate is sprayed on, wiped on or otherwise applied to those portions of the substrate not to be contacted with polytetrafluoroethylene. This can be done before or after application of the particulate polytetrafluoroethylene. The applied silicate solution is then allowed to dry either by standing or through the application of heat at a temperature of about 60 to 90° C. In the case of cloth, to be laminated to polytetrafluoroethylene, particularly cotton cloth, it is preferable to immerse the entire cloth in the alkali silicate solution and to then dry the cloth before application of the particulate polytetrafluoroethylene. This procedure is also applicable, where desired, to other extremely porous substrates. The porosity of the substrate, in such event permits the lamination of the polytetrafluoroethylene to the substrate notwithstanding the presence of the insulating material.

The process of the invention can be employed to produce coated laminates in which the substrate and polytetrafluoroethylene layers have any desired total thickness and in which one surface is the substrate and one polytetrafluoroethylene, or both surfaces are of polytetrafluoroethylene, in which case the process of this invention would be carried out on both sides of the substrate. Alternatively, the polytetrafluoroethylene can be sandwiched between two substrates, alike or different by bonding the polytetrafluoroethylene to each of the substrates in accordance with the process of this invention. The thickness of the layers is dependent only upon the thickness of the substrate layer and of the polytetrafluoroethylene film which is adhered thereto. Polytetrafluoroethylene films can readily be prepared in thicknesses ranging upwards from 0.001″ to many inches. The polytetrafluoroethylene surface coating remains adherent to the treated substrate up to the softening temperature of polytetrafluoroethylene, and does not develop cracks or other surface defects on long usage or wear, even at elevated temperatures.

The laminate can be used in the fabrication of polytetrafluoroethylene coated articles of all kinds, using conventional forming techniques applicable to the substrate in question, such as stamping, pressing, cold-forming, spinning, drawing, molding, and the like. Exemplary are cooking and eating utensils, such as pans, pots, trays and forms, chemical reactors, tanks, towers and pressure vessels, electric capacitors, interior-coated molds used to cure polymeric materials, as a permanent nonadhering surface, laminate sheets having both exposed surfaces coated with polytetrafluoroethylene, used as shields in electronic equipment to prevent cross interference between circuits, laminates having a polytetrafluoroethylene layer between two surface metal layers to serve as insulators in printed circuitry, non-ice adherent coatings for aeroplanes, panels for building construction, both interior and exterior, boat hulls, nonfriction surfaces, bearing surfaces, glazed surfaces, for ceramics, to eliminate porosity, and articles coated with polytetrafluoroethylene, to which the laminate is bonded, substrate side down, usually using thin foils as the substrate layer.

For those applications in which the laminate will be subjected to a great deal of abrasion in use, such as in bearing surfaces, it is often preferable to employ a filled polytetrafluoroethylene as the continuous layer. The filler serves to increase the abrasion resistance of the polytetrafluoroethylene and also, in some instances, acts as an auxiliary lubricant. The laminate can be fabricated directly into a bearing or the laminate can be used as a bearing liner, replacing, for example, the babbit metal conventionally employed as liner in a one piece cast-iron babbitted pillow block.

The following examples in the opinion of the inventor represent preferred embodiments of the invention.

EXAMPLE 1

A sheet of Duralumin, a commercially available aluminum alloy composed of about 94% aluminum, about 4% copper and small amounts of magnesium and manganese, was cleaned by dipping in hot trichloroethylene, and was then etched by immersion in an aqueous 10% hydrochloric acid solution at a temperature of 160° F. for three minutes. The sheet was then washed with water and dried. Thereafter, 150 grams of a commercial powdered polytetrafluoroethylene corresponding to "Type III" of ASTM Standard D–1457–62T were applied to one surface of the sheet, which measured 12 inches by 12 inches, and spread evenly over the sheet with a brush to produce a discontinuous coating approximately 0.005″ thick.

The coated sheet was contacted with a continuous film of Teflon, 0.003″ thick, and the film and coated plate were compressed between two padded platens under a pressure of about 200 p.s.i. for six minutes. The platen below the metal was cold, and the platen in contact with the Teflon film was held at a temperature of 750° F. The laminate was transferred from the heated press into a water-cooled press, and pressed at 200 p.s.i. for three minutes, by the end of which time the laminate had reached the temperature of the press. The resulting laminate was tightly bonded, and could be cold-formed into a variety of shapes either by application of spinning or drawing. It was formed into frying pans, which successfully resisted application of heat as high as 600° F. without separation of the Teflon coating from the metal.

EXAMPLE 2

A metal sheet composed of cold hardened aluminum was freed of its oxide film by heating at 700° F. for two hours, and was then etched by immersion in a 20% aqueous solution of sodium hydroxide. The etched sheet was washed with water, dried, and then brush coated with the same particulate polytetrafluoroethylene as in Example 1. Sufficient material was applied to form a coating layer about 0.0003″ thick covering approximately 70% of the surface of the sheet. The thus coated sheet was then contacted with polytetrafluoroethylene film, approximately 0.001″ thick, and placed between to weighted platens between which a pressure of about 125 p.s.i. was applied. The platen-laminate assembly was placed in a hot air oven and the temperature of the oven was raised from 70° F. to 750° F. in one hour, held at 750° for five minutes and the assembly was then allowed to cool slowly over a period of 2½ hours to room temperature with the oven doors open. The platens were then removed. The resulting laminate was strongly bonded, and could be cold-formed into a variety of shapes by spinning or drawing. The articles could be subjected to temperatures ranging up to 600° F. without affecting the bonding or continuity of the polytetrafluoroethylene surface.

EXAMPLE 3

The procedure of Example 1 was repeated using as the continuous polytetrafluoroethylene film a filled polytetrafluoroethylene composition containing 25% by volume of glass fibers and 75% by volume of polytetrafluoroethylene. The resultant laminate was formed into a cylindrical bearing liner, the polytetrafluoroethylene being the interior surface. The Duralumin outer surface of the laminate was press fit into the inside of a metal pillow block in conventional manner. In use, the bearing liner prepared in accordance with this invention showed a high resistance to abrasion and did not require the presence of any lubricants.

EXAMPLE 4

A carbon steel sheet was cleaned by immersion in cold perchloroethylene, and then etched by immersion for four minutes in a 10% aqueous nitric acid solution at room temperature, washed and dried. Particulate polytetrafluoroethylene corresponding to "Type II" described in ASTM Standard D–1457–62T was then poured on to one surface of the sheet and spread by means of a trowel, using light pressure, to produce a coating of polytetrafluoroethylene approximately 0.0003 inch thick.

The coated metal was then laminated to a continuous film of polytetrafluoroethylene film in accordance with the procedure of Example 1, at a pressure of 300 p.s.i., and a temperature of 775° F., maintained for six minutes. The laminate was strongly bonded and resisted separation even when heated at temperatures up to 600° F. for several hours.

EXAMPLE 5

A copper sheet was first cleaned in hot trichloroethylene, sand blasted with very fine sand to produce a roughened surface and then cleaned again. Thereafter the "Type II" particulate polytetrafluoroethylene was applied, using a trowel, to produce a discontinuous anchoring layer approximately 0.0001 inch thick over about 60% of the surface of the sheet. Thereafter, the sheet was heated in an oven at 700° F. for 20 minutes. After being cooled to room temperature, a film of 0.0003 inch thick polytetrafluoroethylene was applied over the particulate coating and the laminate pressed between platens at a pressure of 200 p.s.i. and heated at a temperature of 750° F. for six minutes. The laminate was cooled under the same pressure and then cold-formed into a dish. The resulting dish was resistant to chemical attack, and the polytetrafluoroethylene film did not separate therefrom even when heated at 600° F.

EXAMPLE 6

An aluminum sheet was cleaned in hot trichloroethylene and then sand blasted with very fine sand to produce a roughened surface. The sheet was cleaned again, and brush coated on both sides with "Type III" particulate polytetrafluoroethylene to produce a discontinuous coating approximately 0.0003 inch thick over about 85% of the total surface area on each side of the aluminum sheet. A polytetrafluoroethylene film 0.0003 inch thick was then applied to each side of the sheet and held in place between two platens which exerted a pressure of 200 p.s.i. The platen assembly was then heated at a temperature of 750° F. for six minutes and cooled under the same pressure. The laminate so produced was then cold-formed into a pan. The resulting pan was resistant to chemical attack, and the polytetrafluoroethylene film did not separate even when heated at 600° F.

EXAMPLE 7

Two aluminum sheets were cleaned by heating in an oven at 900° F., for one hour, and then one side of each sheet was sand blasted with No. 90 grit to produce roughened surfaces. The sheets were cleaned again, and coated on the roughened side with ASTM "Type III" particulate polytetrafluoroethylene producing a discontinuous coating layer 0.003 inch thick over about 70% of the surface of each sheet. Each of the coated surfaces was then placed on opposite sides of a film of polytetrafluoroethylene 0.0003 inch thick and kept in position by application of a pressure of 200 p.s.i. through two padded platens. The assembly heated at a temperature of 750° F., for three minutes and then cooled before the pressure was released. The resulting laminate was tested for heat stability and it was found that the polytetrafluoroethylene film did not separate from either sheet of aluminum even when heated at 600° F.

EXAMPLE 8

A bronze alloy sheet was cleaned by immersion in cold perchloroethylene, and then etched by immersion in a 10% aqueous nitric acid solution at room temperature for four minutes. The etched sheet was washed and dried, and then smeared with ASTM D–1457–62T "Type IV" particulate polytetrafluoroethylene applied in a sufficient amount to produce a discontinuous coating layer of polytetrafluoroethylene approximately 0.0008 inch thick over about 50% of the surface area of the sheet.

The coated metal was laminated to a continuous film of polytetrafluoroethylene 0.0007 inch thick by application of heat to the polytetrafluoroethylene film at a temperature of 775° F. for six minutes at a pressure of 300 p.s.i. The resulting laminate was cooled under a pressure of 250 p.s.i. The laminate was strongly bonded and resisted separation even when heated at temperatures up to 600° F. for several hours.

EXAMPLE 9

A sheet of brass alloy composed of about 70% copper, 1% tin and 29% zinc was cleaned by dipping in hot trichloroethylene, and etched using an aqueous 10% hydrochloric acid solution at 160° F. for three minutes. The sheet was then washed with water, cooled and rub coated with "Type III" particulate polytetrafluoroethylene to produce a discontinuous anchoring layer, about 0.006 inch thick over about 90% of the metal sheet.

The surface of the metal sheet containing the anchoring layer was then brought in contact with a film of polytetrafluoroethylene 0.003 inch thick and the film and coated plate were compressed between two padded platens under a pressure of about 200 p.s.i. for six minutes. The platen below the metal was cold, and the platen in contact with the polytetrafluoroethylene film was held at a temperature of 750° F. The laminate was transferred from the heated press into a water-cooled press, and pressed at 200 p.s.i. for three minutes, by the end of which time the laminate had cooled to room temperature. The resulting laminate was tightly bonded, and could be cold-formed into a variety of shapes by spinning or drawing. It was formed into frying pans, which successfully resisted application of heat as high as 600° F. without separation of the polytetrafluoroethylene film.

EXAMPLE 10

An asbestos sheet was cleaned in warm water. One side of the sheet was brush coated with "Type IV" particulate polytetrafluoroethylene producing a discontinuous coating about 0.0004 inch thick over about 40% of the surface area. To this coating was laminated a 0.003 inch thick film of polytetrafluoroethylene by application of a pressure of 200 p.s.i. at a temperature of 750° F. for six minutes. The laminate was cooled under the same pressure. The resulting sheet was resistant to chemical attack, and the polytetrafluoroethylene film did not separate even when heated at 600° F. for ten hours.

EXAMPLE 11

A nylon plastic sheet was cleaned by immersion in cold water, spray coated on one side with an aqueous solution containing 30% by weight of sodium silicate and then allowed to dry. The other side of the sheet was wire brushed to roughen up the surface. The roughened surface was then brush coated with "Type III" particulate polytetrafluoroethylene applied in a sufficient amount to produce a discontinuous coating layer of polytetrafluoroethylene approximately 0.001 inch thick covering about 75% of the surface of the sheet.

A sheet of polytetrafluoroethylene, 0.005 inch thick was then applied over the discontinuous coating and maintained in position through the use of padded platens at an applied pressure of 150 p.s.i. The platen touching the polytetrafluoroethylene sheet was heated to 700° F. for six minutes while the other platen was maintained at room temperature. Thereafter heating was stopped but pressure was retained until room temperatue was reached. The resulting laminate was strongly bonded and resisted separation even when boiled in water.

EXAMPLE 12

A clean piece of cotton cloth was dipped into an aqueous solution of sodium silicate and then dried. One side of the cloth was then brush coated with ASTM "Type II" particulate polytetrafluoroethylene producing a discontinuous coating about 0.0003 inch thick over about 80% of the surface area.

The surface of the cloth containing the discontinuous polytetrafluoroethylene layer was then brought into contact with a film of polytetrafluoroethylene 0.003 inch thick, and the film and the cloth were pressed between two padded platens under a pressure of about 200 p.s.i. for four minutes. The platen below the cloth was cold, and the platen in contact with the Teflon was held at a temperature of 725° F. The laminate was transferred from the heated press into a water-cooled press, and pressed at 200 p.s.i. for three minutes, by the end of which time the laminate had reached the temperature of the press. The resulting laminate was tightly bonded and did not separate even upon stretching.

EXAMPLE 13

A No. 312 stainless steel sheet was heated at 700° F. for two hours, and then coated with "Type III" polytetrafluoroethylene. Sufficient polytetrafluoroethylene was applied to form a discontinuous layer about 0.0003 inch thick over about 65% of the surface. The coated sheet was heated at 750° F. for 5 minutes and then laminated to a polytetrafluoroethylene film approxiamtely 0.001 inch thick between two padded platens at a pressure of about 250 p.s.i. with the platen in contact with the metal cold and the platen in contact with the polytetrachloroethylene held at 750° F. Pressure was applied for five minutes, and the laminate then transferred to a water cooled press, in which it was pressed at 200 p.s.i. for three minutes. The resutling laminate was strongly bonded, and could be cold-formed into a variety of shapes by spinning or drawing. The articles could be subjected to temperatures ranging up to 600° F. without affecting the bonding or continuity of the polyetetrafluoroethylene surface.

I claim:

1. A method of laminating polytetrafluoroethylene to a dissimilar substrate comprising applying polytetrafluoroethylene particles in substantially dry condition and having an average particle size of at least about 75 microns to a surface of the substrate and superimposing thereover a continuous film of polytetrafluoroethylene, applying pressure to maintain the continuous film in position and heating the polytetrafluoroethylene at a temperature of at least about 650° F., to cause the formation of a laminate having good bond strength.

2. A method as in claim 1 wherein the particulate polytetrafluoroethylene applied to the substrate has an average particle diameter within the range from about 200 to about 650 microns.

3. A method as in claim 2 wherein the particulate polytetrafluoroethylene is applied in the form of a discontinuous layer of a thickness of less than about 0.006 inch covering at least about 30% of the surface of the substrate.

4. A method as in claim 2 wherein light pressure is applied to the particulate polytetrafluoroethylene before superimposition of the continuous film.

5. A method in accordance with claim 1, which comprises cooling the resulting laminate while continuing to apply pressure.

6. A method in accordance with claim 1 in which the substrate is a metal base.

7. A method in accordance with claim 6 in which the metal is comprised of a metal selected from the group consisting of iron, aluminum and copper.

8. A method in accordance with claim 7 in which the metal is steel.

9. A method in accordance with claim 1 in which the substrate is a plastic base.

10. A process in accordance with claim 9 in which the plastic is nylon.

11. A process in accordance with claim 1 in which the substrate is an asbestos base.

12. A method in accordance with claim 1 in which the substrate is a woven fabric base.

13. A process in accordance with claim 1 in which the continuous polytetrafluoroethylene film is a fabric having a surface coating of polytetrafluoroethylene.

14. A process in accordance with claim 1 in which the continuous polytetrafluoroethylene film is comprised of polytetrafluoroethylene and a filler.

15. A process in accordance with claim 14 in which the filler is comprised of glass fibers.

16. A method in accordance with claim 1 wherein a heat insulating material is applied to the substrate prior to lamination.

17. A method in accordance with claim 16 wherein the heat insulating material is an alkali metal silicate.

18. A method for laminating polytetrafluoroethylene to both sides of a dissimilar substrate which comprises applying polytetrafluoroethylene particles in substantially dry condition and having an average particle size of at least about 75 microns to both sides of the substrate, superimposing thereover, on each side, a continuous film of polytetrafluoroethylene, applying pressure to maintain the continuous film in position and heating the polytetrafluoroethylene at a temperature of at least about 650° F., to cause the formation of a laminate having good bond strength.

19. A laminate comprising a substrate, a continuous film of polytetrafluoroethylene, and a discontinuous layer of polytetrafluoroethylene particles intermediate said substrate and said continuous film, said particles having an average diameter of at least about 75 microns.

20. A laminate as in claim 19 wherein the particulate polytetrafluoroethylene has an average particle diameter within the range from about 200 to about 600 microns.

21. A laminate as in claim 20 wherein the particulate polytetrafluoroethylene is present in the form of a layer having a thickness of less than about 0.006 inch covering at least about 30% of the laminated surface of the substrate.

22. A laminate as in claim 21 wherein the substrate contains a coating of a heat insulating material.

23. A laminate as in claim 22 wherein the heat insulating material is an alkali metal silicate.

24. A laminate as in claim 19 wherein the substrate is a fabric base.

25. A laminate as in claim 19 wherein the substrate is a metal base.

26. A laminate as in claim 25 wherein the metal is comprised of a metal selected from the group consisting of iron, copper and aluminum.

27. A laminate as in claim 26 wherein the metal is steel.

28. A laminate as in claim 19 wherein the substrate is a plastic base.

29. A laminate as in claim 28 wherein the plastic is nylon.

30. A laminate as in claim 19 wherein the continuous film of polytetrafluoroethylene is comprised of polytetrafluoroethylene and a filler.

31. A laminate as in claim 30 wherein the filler is comprised of glass fibers.

32. A laminate as in claim 19 in which the continuous polytetrafluoroethylene film is present in the form of a polytetrafluoroethylene coated fabric.

33. A laminate as in claim 19 in the form of a bearing.

34. A laminate as in claim 19 in the form of a cooking utensil.

35. A laminate comprising in sequence and bonded together (a) a continuous film of polytetrafluoroethylene, (b) a discontinuous layer of particulate polytetrafluoroethylene, having an average particle size of at least about 75 microns, (c) a dissimilar substrate, (d) a discontinuous layer of particulate polytetrafluoroethylene and (e) a continuous film of polytetrafluoroethylene.

36. A method of forming a laminated structure of a polytetrafluoroethylene film and a dissimilar metallic substrate comprising cleaning and roughening the metallic substrate, applying to the metallic substrate a plurality of dry polytetrafluoroethylene particles having an average diameter of at least about 75 microns to produce a discontinuous layer covering at least about 30% of the surface of the substrate being laminated, superimposing thereover, without fusing the said particles, a continuous film of polytetrafluoroethylene, applying pressure to maintain intimate contact, and thereafter, while maintaining the pressure, heating the laminate at a temperature of from about 650° F. to 800° F. and thereafter cooling, to produce a strongly bonded laminate.

References Cited by the Examiner

UNITED STATES PATENTS

| Re. 24,856 | 8/1960 | Panagrossi et al. | 156—333 X |
|---|---|---|---|
| 2,484,484 | 10/1949 | Berry | 156—333 |
| 2,562,117 | 7/1951 | Osdal | 260—29.6 |
| 2,567,162 | 9/1951 | Sanders | 117—70 |
| 2,728,698 | 12/1955 | Rudner | 161—189 X |
| 2,777,783 | 1/1957 | Welch | 117—75 |
| 2,798,005 | 7/1957 | Love | 117—8 |
| 2,944,917 | 7/1960 | Cahne | 117—49 |
| 2,984,599 | 5/1961 | Edwards et al. | 156—333 |
| 3,056,709 | 10/1962 | Rising et al. | 156—7 |

EARL M. BERGERT, *Primary Examiner.*

HAROLD ANSHER, *Examiner.*